US012384015B2

(12) United States Patent
Chen et al.

(10) Patent No.: US 12,384,015 B2
(45) Date of Patent: Aug. 12, 2025

(54) TELESCOPIC WRENCH

(71) Applicants: Yi-Fu Chen, Taichung (TW); He-Qian Chen, Taichung (TW)

(72) Inventors: Yi-Fu Chen, Taichung (TW); He-Qian Chen, Taichung (TW)

(73) Assignee: Yi-Fu Chen, Taichung (TW)

( * ) Notice: Subject to any disclaimer, the term of this patent is extended or adjusted under 35 U.S.C. 154(b) by 358 days.

(21) Appl. No.: 18/132,434

(22) Filed: Apr. 10, 2023

(65) Prior Publication Data

US 2024/0335935 A1 Oct. 10, 2024

(51) Int. Cl.
*B25G 1/04* (2006.01)

(52) U.S. Cl.
CPC .................................... *B25G 1/043* (2013.01)

(58) Field of Classification Search
CPC ........ B25G 1/04; B25G 1/043; B25B 13/481; B25B 23/16
USPC .......................................................... 81/177.2
See application file for complete search history.

(56) References Cited

U.S. PATENT DOCUMENTS 6,389,931 B1 * 5/2002 Delaney .................. B25B 13/06 81/177.2
6,408,721 B1 * 6/2002 Lee ........................ B25G 1/005 81/177.2
6,901,826 B2 * 6/2005 Huang ................ B25B 23/0021 81/177.2
7,013,765 B2 * 3/2006 Chang .................... B25G 1/005 81/177.85
7,093,521 B2 * 8/2006 Lee ..................... B25B 23/0021 81/177.2
7,677,140 B2 * 3/2010 Hull ....................... B25G 1/043 81/177.2
7,878,094 B2 * 2/2011 Lin ........................ B25G 1/043 81/177.2
8,739,662 B2 * 6/2014 Huang ................... B25G 1/043 81/177.85
9,358,678 B2 * 6/2016 Lai ......................... B25G 1/043
11,338,428 B2 * 5/2022 Hsieh ...................... B25G 1/043
11,383,372 B2 * 7/2022 Avalos ................ B25B 23/0021
2004/0020331 A1 * 2/2004 Lee ........................ B25B 13/463 81/177.2
2023/0202021 A1 * 6/2023 Lai ...................... B25B 23/0021 81/177.2

* cited by examiner

*Primary Examiner* — David B. Thomas

(57) ABSTRACT

A telescopic wrench includes an outer tube, an outer sleeve, and an inner rod. The first hole of the outer sleeve ring is fitted onto the outer tube, and the second hole of the outer sleeve provides peripheral contact with the rod section of the inner rod. The outer sleeve forms an external auxiliary fitting structure with the inner rod and outer tube. The telescopic wrench provides an improvement over known structures that are prone to loosening and noise during use. The telescopic wrench enhances the structural strength when subjected to operating forces.

9 Claims, 14 Drawing Sheets

TELESCOPIC WRENCH

BACKGROUND OF THE INVENTION

1. Fields of the Invention

The present invention relates to a hand tool, and more particularly, to a telescopic wrench that is length adjustable.

2. Descriptions of Related Art

Currently, the industry has developed adjustable wrenches with variable lengths, such as Taiwanese New Model M429564, China invention CN111975699B, and the US invention US20170312906A1. These wrenches mainly use an outer sleeve to fit onto an inner tube. When adjusting the length, the inner tube and outer sleeve slide axially towards each other to shorten the overall length, and slide away from each other to elongate the overall length.

When the above adjustable wrenches are extended, the contact area between the outer sleeve and inner tube gradually decreases. This means that the force applied to the wrench needs to be borne by the contact area between the two, which not only raises concerns about insufficient structural strength due to force concentration, but also increases the likelihood of loosening and operational noise occurring at this point.

The present invention intends to provide a telescopic wrench to eliminate the shortcomings mentioned above.

SUMMARY OF THE INVENTION

The present invention relates to a telescopic wrench and comprises an outer tube having a passage defined axially therein. The outer tube has a first end and a second end on two opposite ends of the outer tube. An outer sleeve has a first hole and a second hole which is in communication with the first hole. The first hole of the outer sleeve is fitted to the first end of the outer tube. An inner rod has a work end and a rod section connecting to the work end. The rod section has an annular groove in which an elastic ring is engaged. The rod section is slidably engaged with the passage and the second hole. The elastic ring is compressed by contact with the inner periphery of the passage. The work end is exposed beyond the first end of the outer tube.

The present invention also provides another telescopic wrench and comprises an outer tube having a passage defined axially therein. The outer tube has a first end and a second end on two opposite ends of the outer tube. An accommodating hole is defined in the first end of the outer tube and communicates with the passage. An end part includes an insertion section and an external section formed on two opposite ends thereof. The insertion section is inserted into the accommodating hole of the outer tube. The external section is located at the outside of the first end of the outer tube. A through hole is defined through the insertion section and the external section. The through hole communicates with the passage. An inner rod has a work end and a rod section connecting to the work end. The rod section is slidably engaged with the passage and the through hole. The elastic ring is compressed by contact with the inner periphery of the passage. The work end is exposed beyond the external section of the end part.

The advantages of the present invention are that with the above structure in place, the outer sleeve and the end part can be securely connected to the first end of the outer tube. The second hole of the outer sleeve provides peripheral contact with the rod section of the inner rod, allowing the outer sleeve and the end part to form an external auxiliary fitting structure with the inner rod and outer tube. By doing so, the telescopic wrench provides an improvement over past known structures that are prone to loosening and noise during use. Furthermore, this enhances the structural strength of the wrench when subjected to operating forces.

In addition, the elastic ring can undergo deformation under compressive forces, providing a smooth and dampened manual operation when adjusting the length of the telescopic wrench by pushing or pulling the outer sleeve or inner rod. Furthermore, this helps to reduce the impact of foreign objects and impurities from entering and affecting the operation of adjusting the overall length of the telescopic wrench.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
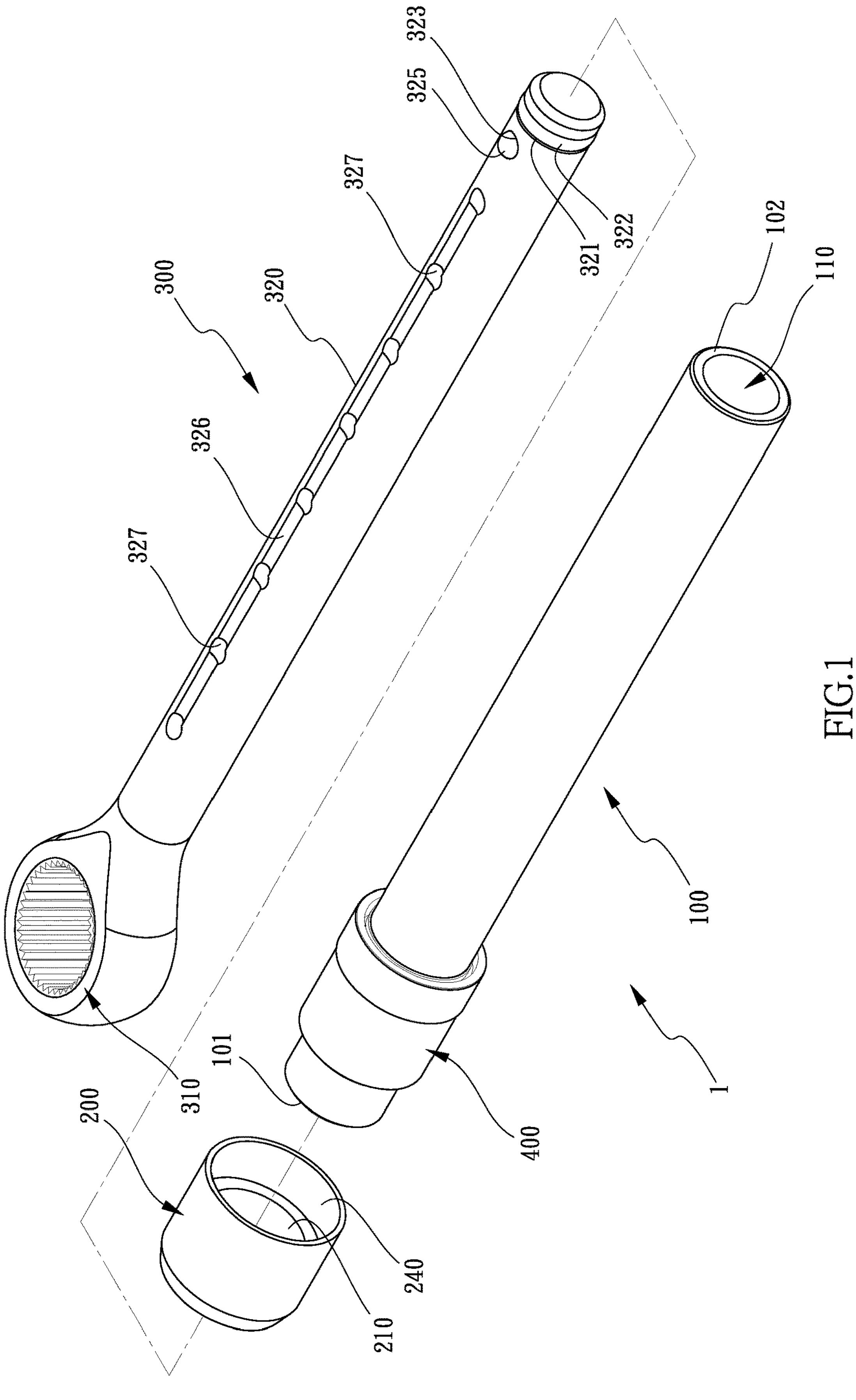
FIG. 1 is an exploded view of the telescopic wrench of the present invention.
Figure 2:
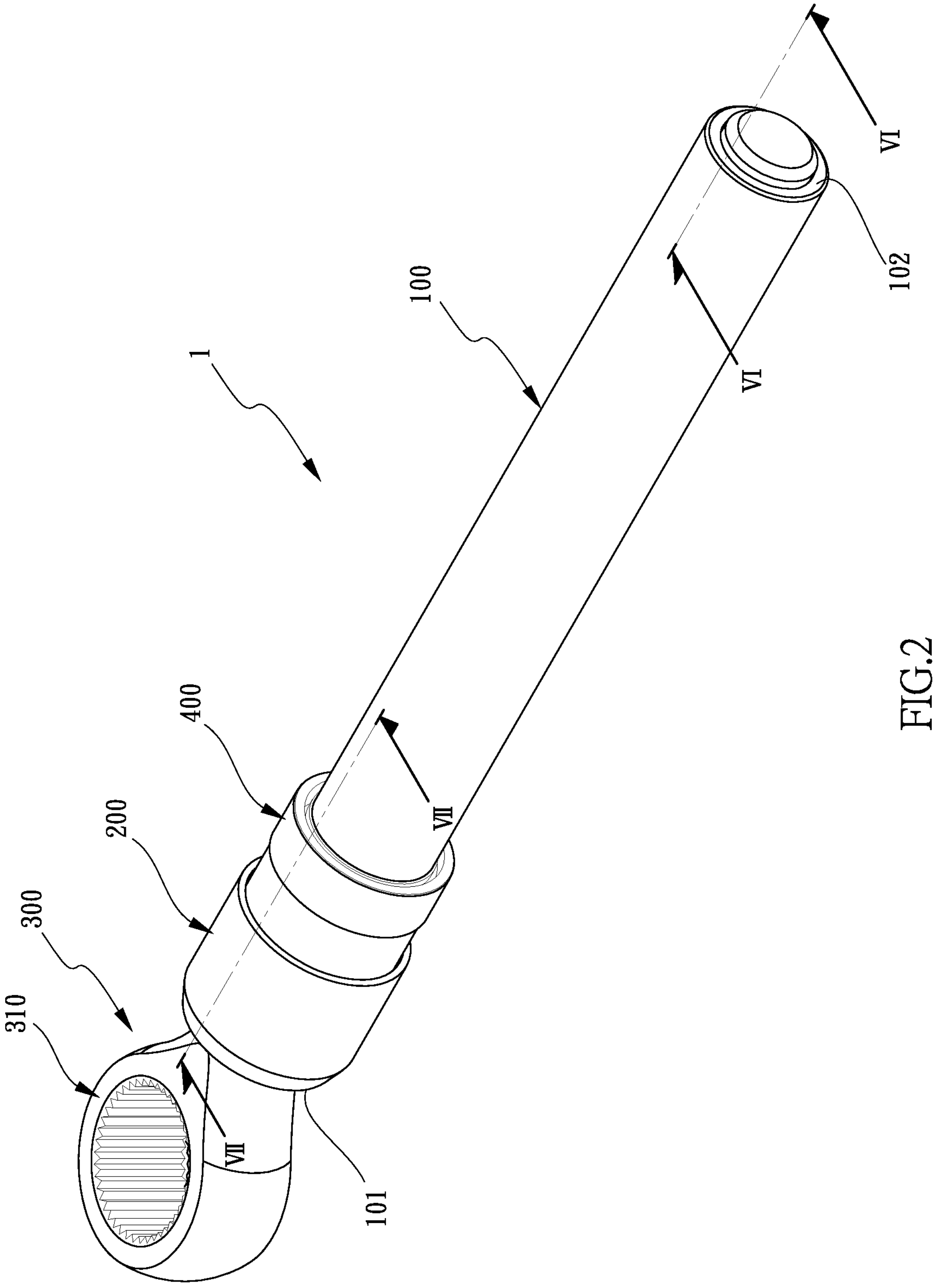
FIG. 2 is a perspective view to show the telescopic wrench of the present invention.
Figure 3:
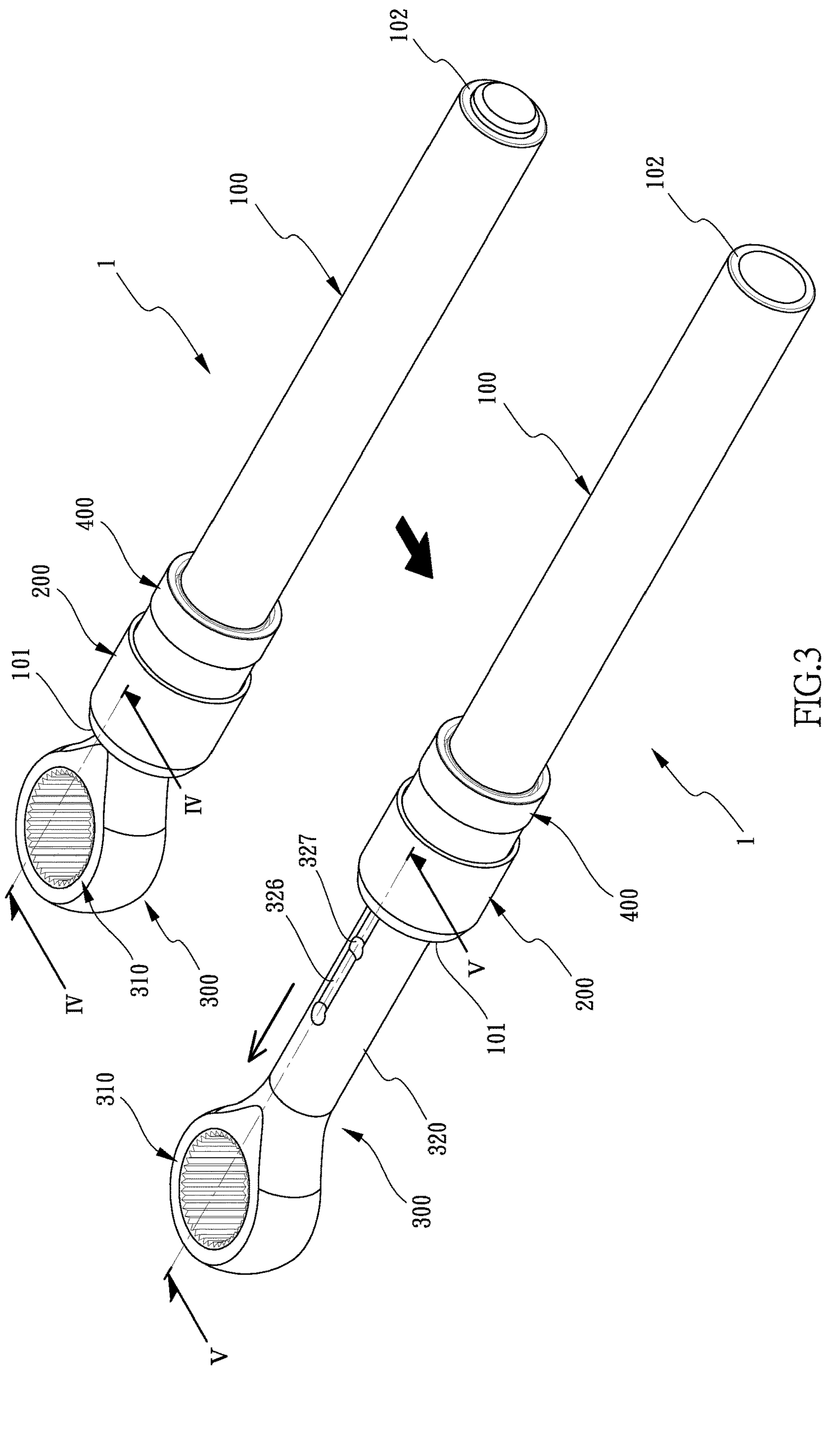
FIG. 3 shows the length adjustment of the telescopic wrench of the present invention.
Figure 4:
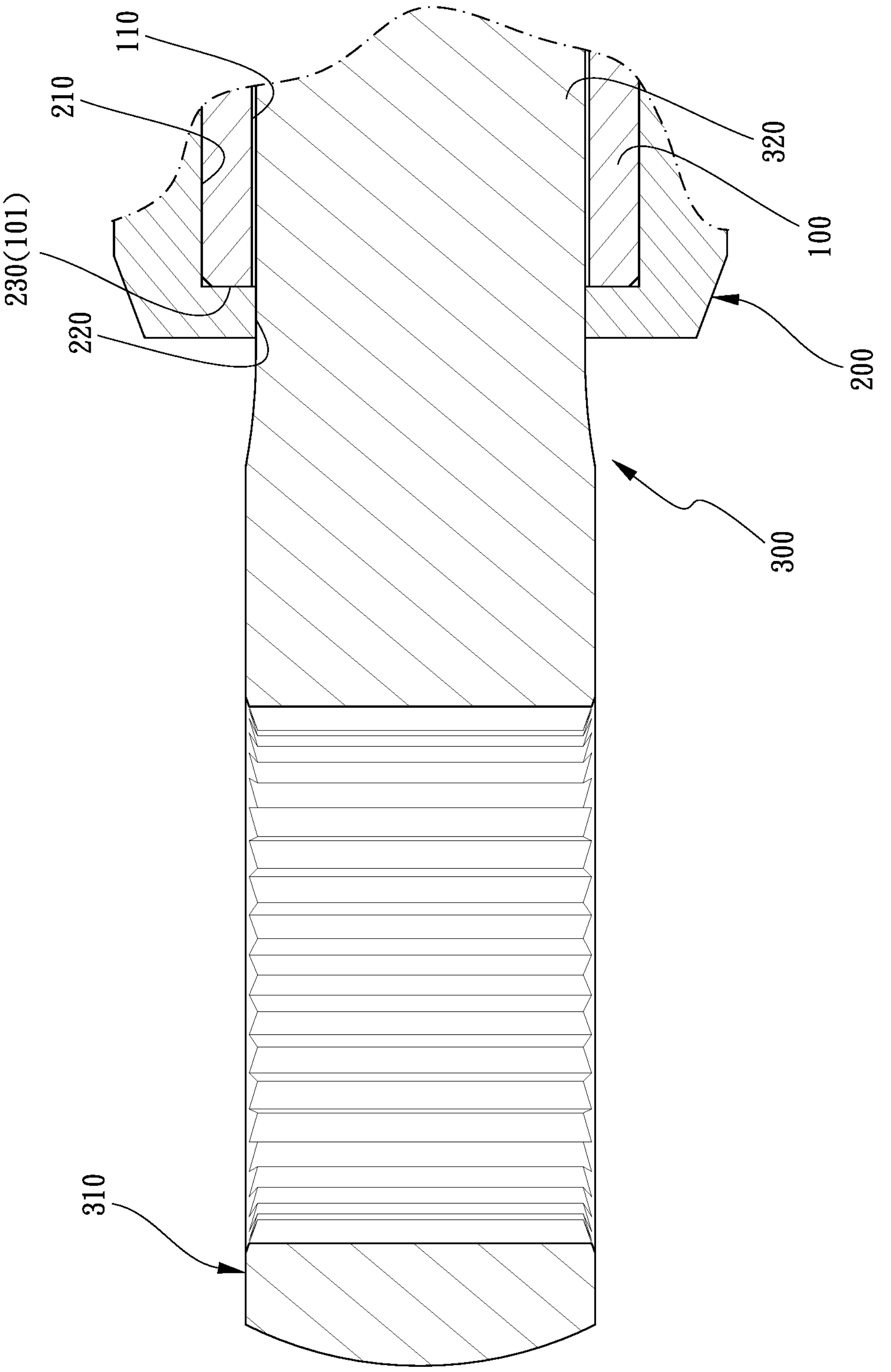
FIG. 4 is a cross sectional view, taken along line IV-IV in FIG. 3.
Figure 5:
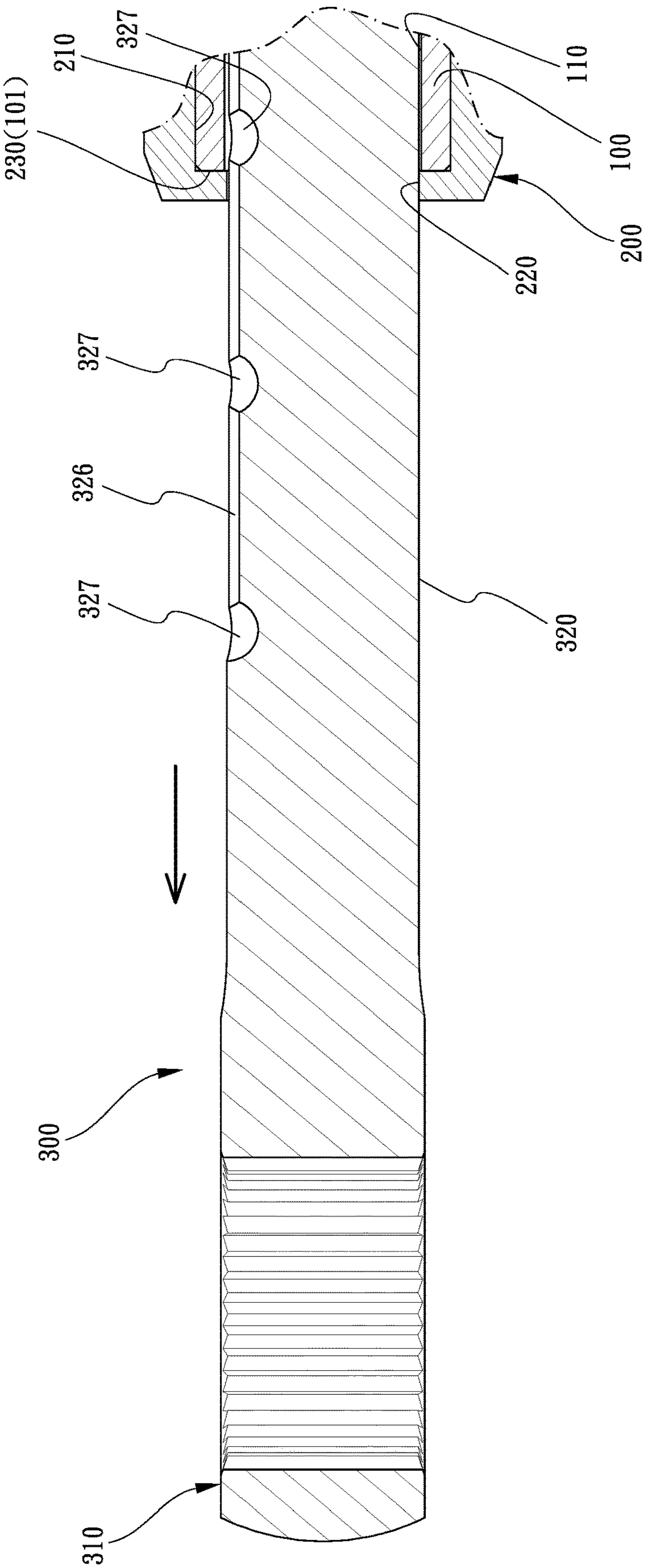
FIG. 5 is a cross sectional view, taken along line V-V in FIG. 3.

Referring to FIGS. 1 to 6, the telescopic wrench 1 of the present invention comprises an outer tube 100 having a passage 110 defined axially therein. The outer tube 100 has a first end 101 and a second end 102 on two opposite ends of the outer tube 100. An outer sleeve 200 has a first hole 210 and a second hole 220 which is in communication with the first hole 210. The first hole 210 of the outer sleeve 200 is fitted to the first end 101 of the outer tube 100. An inner rod 300 has a work end 310 and a rod section 320 connecting to the work end 310. The rod section 320 has an annular groove 321 with which an elastic ring 322 is engaged. The rod section 320 is slidably engaged with the passage 110 and the second hole 220. The elastic ring 322 is compressed by contact with the inner periphery of the passage 110. The work end 310 is exposed beyond the first end 101 of the outer tube 100.

The first hole 210 of the outer sleeve 200 can be securely connected to the first end 101 of the outer tube 100. The second hole 220 of the outer sleeve 200 provides peripheral contact with the rod section 320 of the inner rod 300, including that the rod section 320 slidingly contacts the second hole 220, and when the rod section 320 is maintained still. This allows the outer sleeve 200 to form an external auxiliary fitting structure with the inner rod 300 and outer tube 100. By doing so, the telescopic wrench 1 provides an improvement over past known structures that are prone to loosening and noise during use. Furthermore, this enhances the structural strength of the wrench when subjected to operating forces.

The elastic ring 322 is made by rubber which can be deformed when being compressed and returns to its initial status when the compression is removed. The elastic ring 322 provides a smooth and dampened manual operation when adjusting the length of the telescopic wrench 1 by pushing or pulling the outer tube 100 or inner rod 300. Furthermore, this helps to reduce the impact of foreign objects and impurities from entering and affecting the operation of adjusting the overall length of the telescopic wrench 1.

The work end 310 of the inner rod 300 can be in various forms, such as an open-end wrench, a box-end wrench, a ratchet wrench, and the like, and is not limited to the appearance of the working end 310 as shown in the drawings. The outer sleeve 200 is made of a non-rigid material, such as plastic, and can be replaced with a new one and reinstalled when it is damaged.

The outer sleeve 200 has an abutment surface 230 formed between the first hole 210 and the second hole 220. The abutment surface 230 is in contact with the end face of the first end 101 of the outer tube 100. The abutment surface 230, the inner periphery of the first hole 210 and the inner periphery of the second hole 220 are continuously connected to each other, thereby increasing contact area between the outer sleeve 200, the rod section 320 and the outer tube 100 to provide smooth operation.

Figure 6:
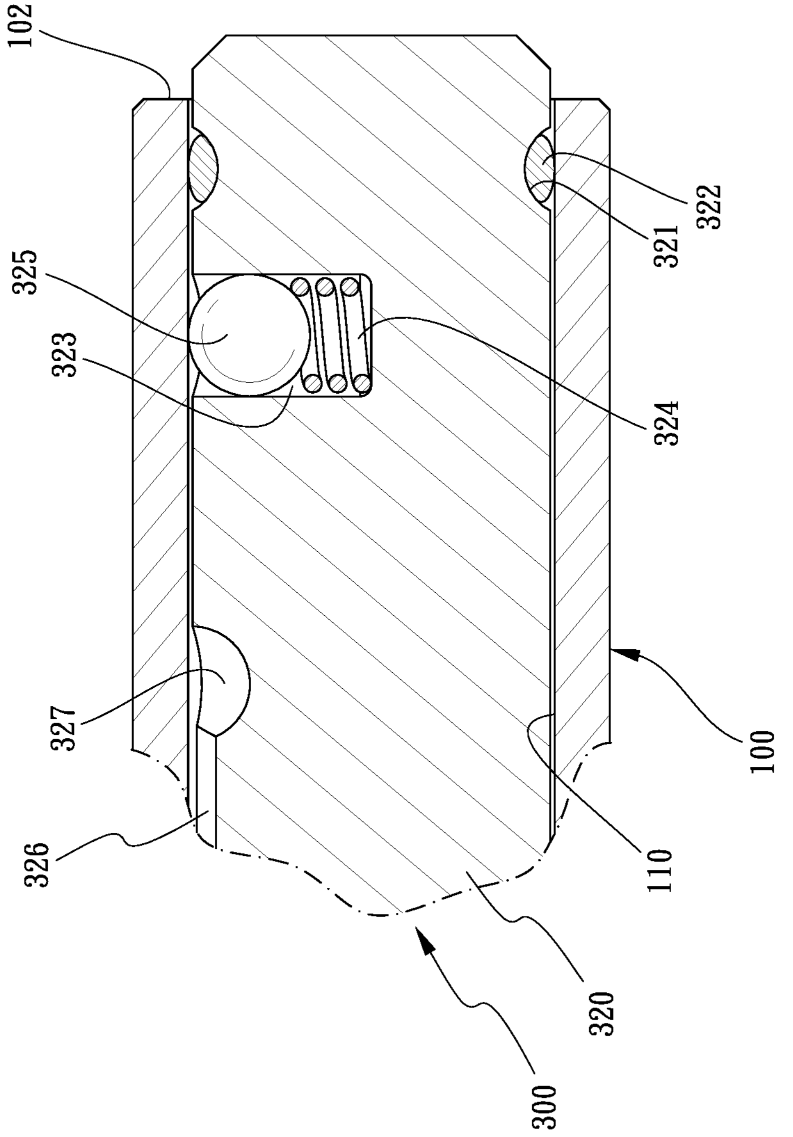
FIG. 6 is a cross sectional view, taken along line VI-VI in FIG. 2.

As shown in FIG. 6, the rod section 320 has a hole 323 defined radially in the outer periphery thereof. An elastic member 324 is elastically biased between an inner periphery of the hole 323 and a bead 325. The bead 325 contacts the passage 110. The hole 323 does not penetrates through the rod section 320 in radially direction. The hole 323 is located opposite to the work end 310 of the rod section 320. The elastic member 324 is a spring, and the bead 325 is a metal bead to provide smooth operation when adjusting the length of the telescopic wrench 1.

As shown in FIGS. 1, 7 to 11, the rod section 320 has an axial groove 326 defined axially in the outer periphery of the rod section 320. Multiple dents 327 are spaced along the axial groove 326. The outer tube 100 has a bore 120 defined in the outer periphery thereof and communicating with the passage 110. A sliding sleeve 400 is slidably mounted to the outer tube 100 and has a protrusion 410 protruded from the inner periphery thereof. A ball 510 is located in the bore 120 and engaged with one of the dents 327. The protrusion 410 is located corresponding to the bore 120 and restricts the ball 510 from dropping out from the bore 120. The ball 510 is partially located in the bore 120 and partially located in the dent 327. Therefore, the telescopic wrench 1 can be adjusted to be different lengths.

The sliding sleeve 400 includes a first recess 420 and a second recess 430. The protrusion 410 is located between the first and second recesses 420, 430. The outer tube 100 has a first ring 130 mounted to the outer periphery of the outer tube 100 and located in the first recess 420. The outer tube 100 extends through a spring 520 which is located between the first ring 130 and a first end face 440 on one of two sides of the protrusion 410 of the sliding ring 400. When the sliding sleeve 400 is pulled toward the second end 102, the protrusion 410 of the sliding sleeve 400 is removed from the bore 120. When the second recess 430 of the sliding sleeve 400 is moved to the bore 120, either the inner rod 300 or the outer tube 100 can be easily moved. The inner periphery of the bore 120 can remove the ball 510 from the dent 327, and the ball 510 partially exposed beyond the bore 120 and is located corresponding to the second recess 430. Therefore, the ball 510 can be moved along the axial groove 326 until the ball 510 is engaged with another dent 327 to complete the length adjustment of the telescopic wrench 1. The first ring 130 in this embodiment is a C-clip.

A second ring 140 is mounted to the outer periphery of the outer tube 100 and is spaced from the first ring 130. When the sliding sleeve 400 is moved toward the first end 101, the second ring 140 contacts the second end face 450 of another one of two sides of the protrusion 410 of the sliding sleeve 400 so as to restrict the sliding sleeve 400 from disengaging from the outer tube 100 from the first end 101. The second ring 140 in this embodiment is a C-clip.

As shown in FIGS. 8-11, when adjusting the length of the telescopic wrench 1, the user holds the outer tube 100 by one hand, and the other hand pulls the work end 310 of the inner rod 300 in the direction away from the outer tube 100. Alternatively, the user may hold the work end 310 of the inner rod 300 by one hand, and the other hand pulls the outer tube 100 in the direction away from the inner rod 300. The user can also hold the outer tube and the work end 310 of the inner rod 300 by both of his/her hands and pull in two opposite directions.

Figure 7:
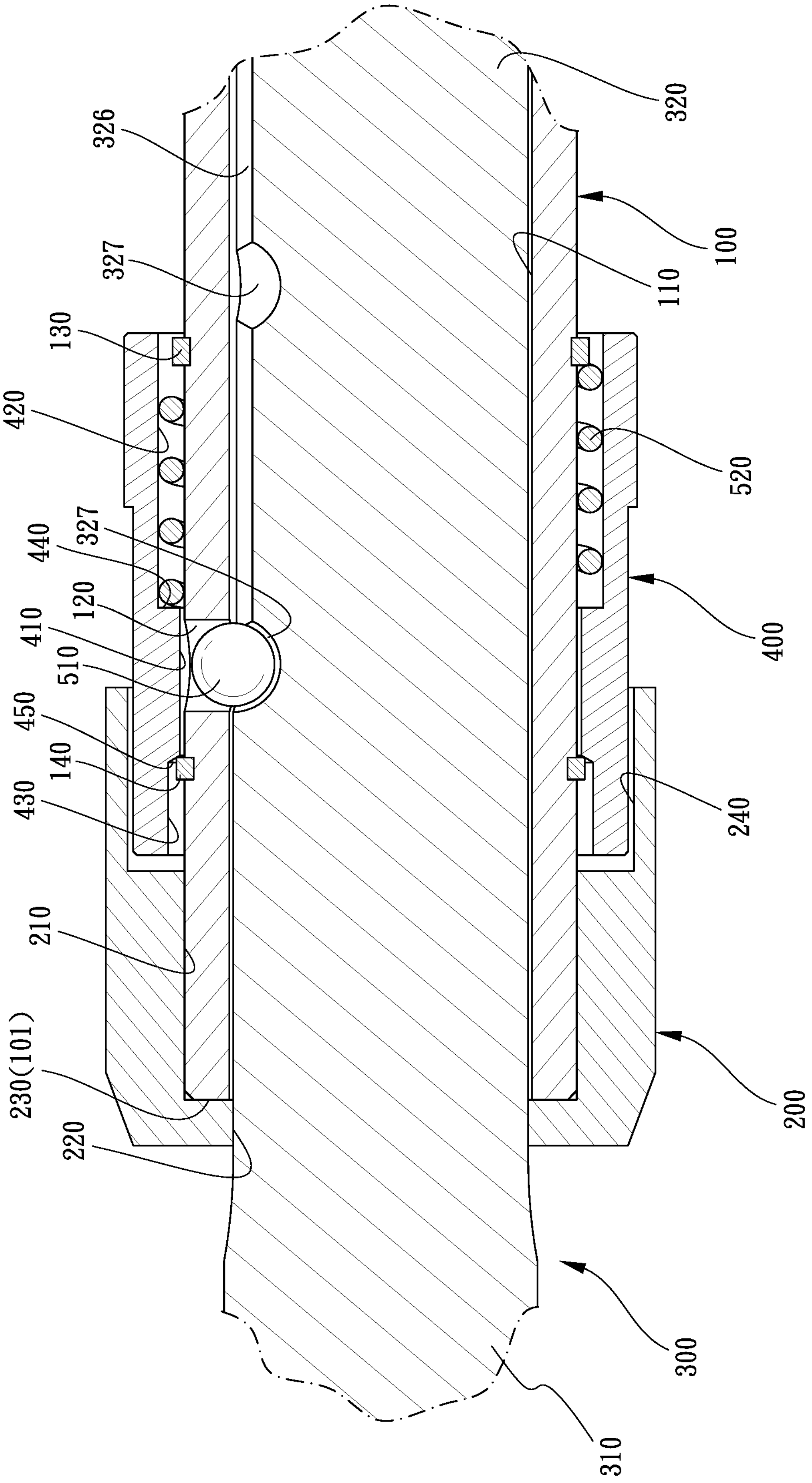
FIG. 7 is a cross sectional view, taken along line VII-VII in FIG. 2.
Figure 8:
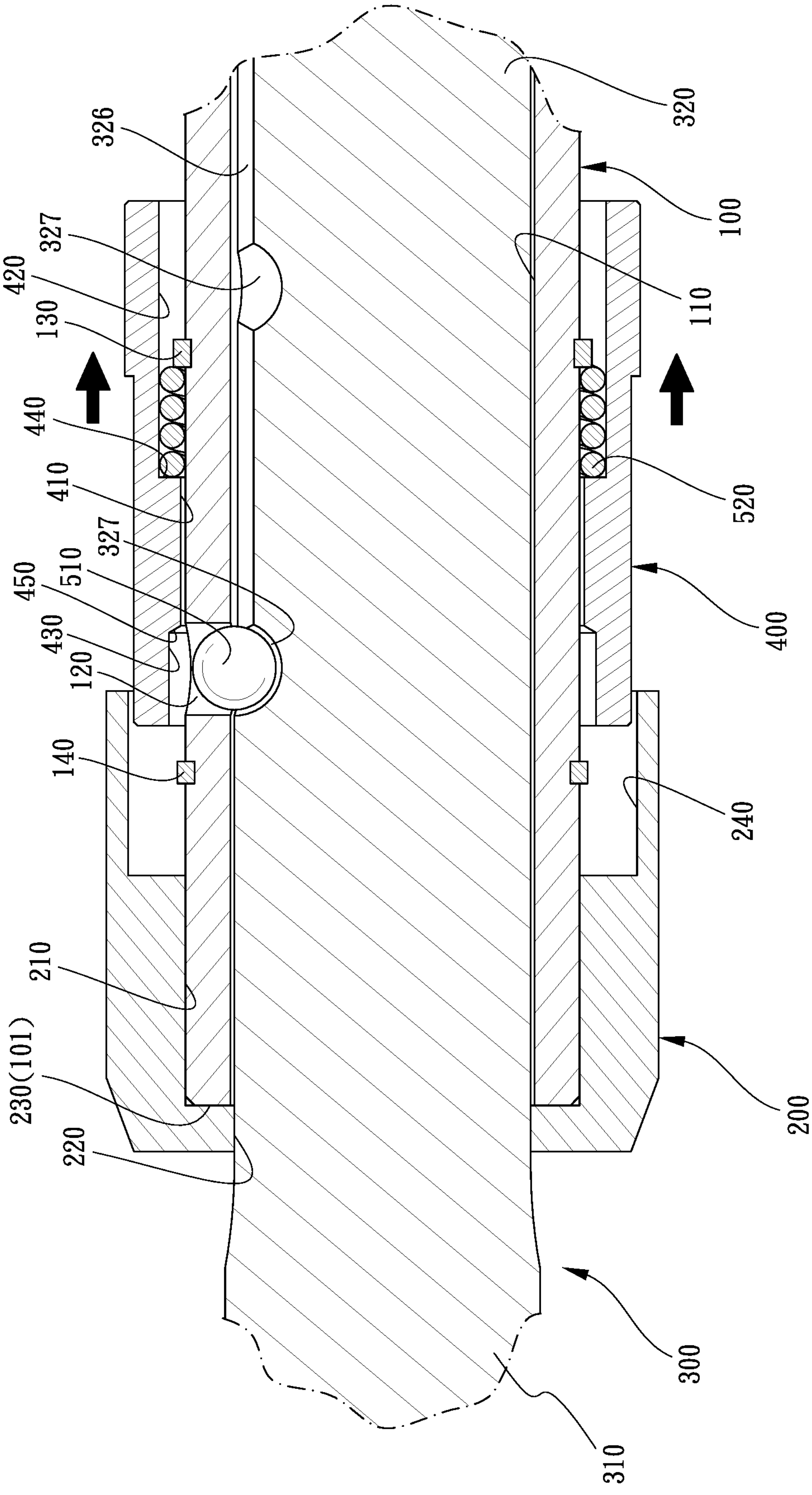
FIG. 8 shows that the sliding sleeve in FIG. 7 is pulled.
Figure 9:
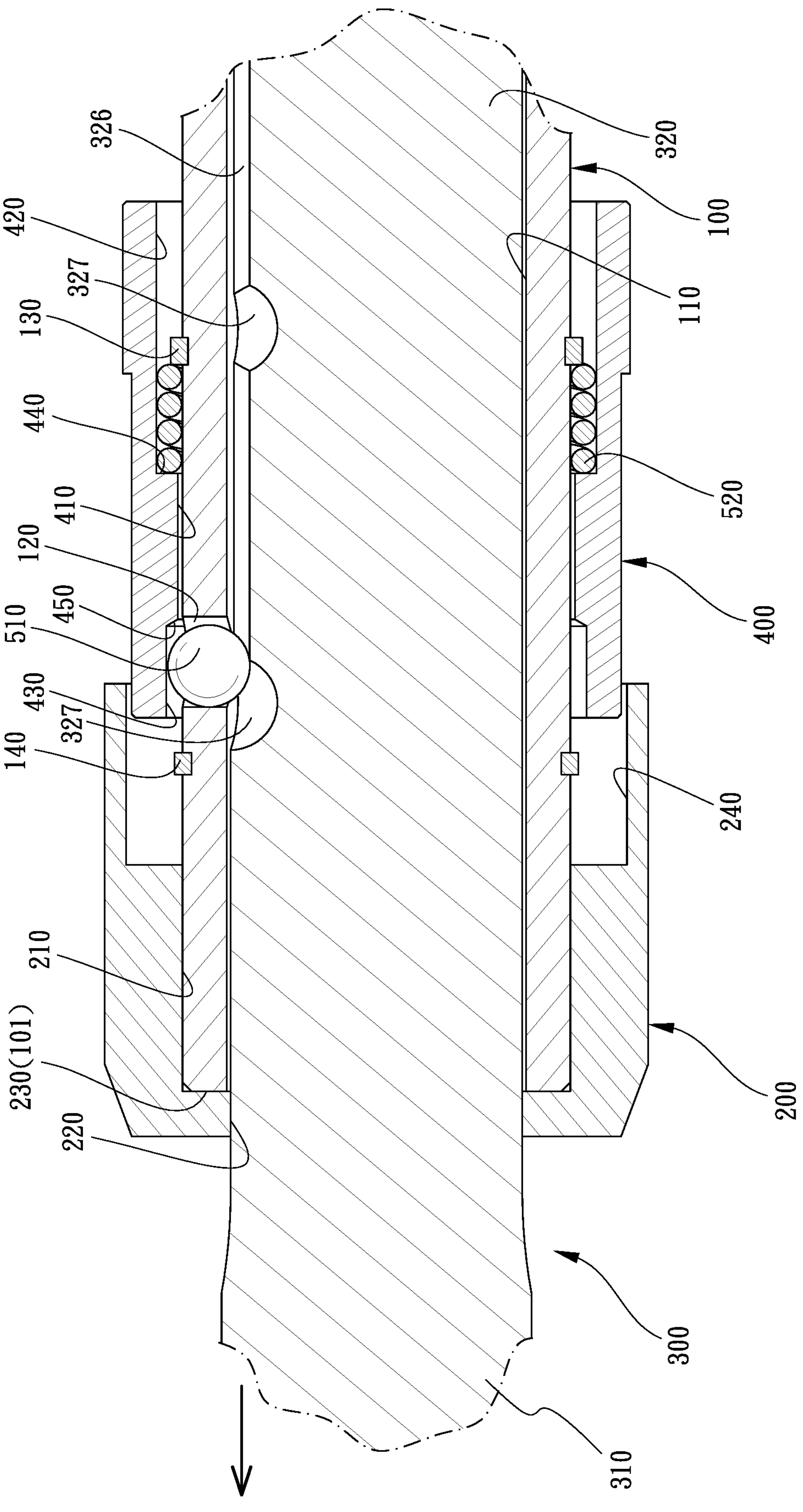
FIG. 9 shows that the inner rod in FIG. 8 is pulled.
Figure 10:
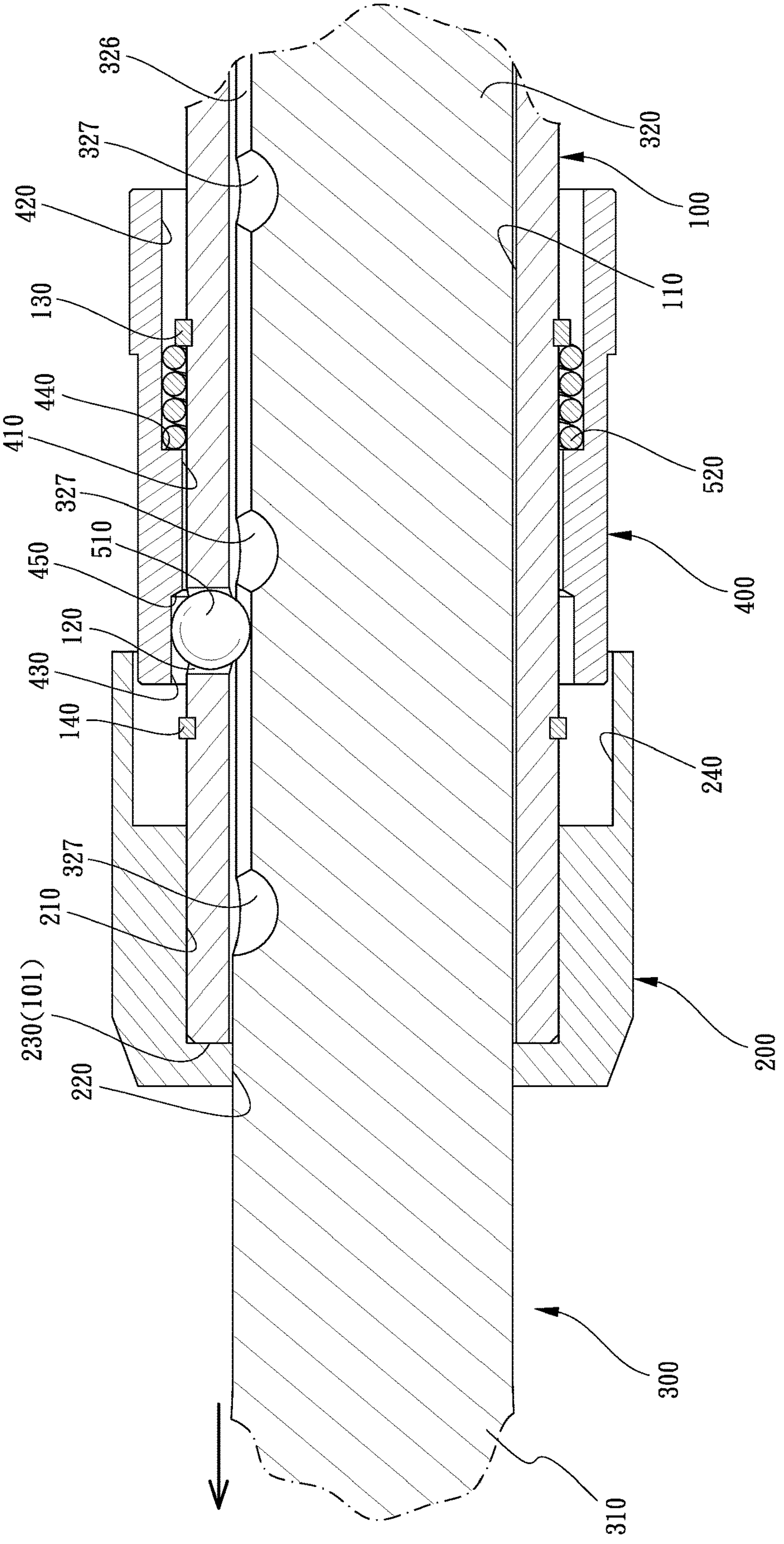
FIG. 10 shows the movement of the ball when the inner rod in FIG. 9 is pulled.
Figure 11:
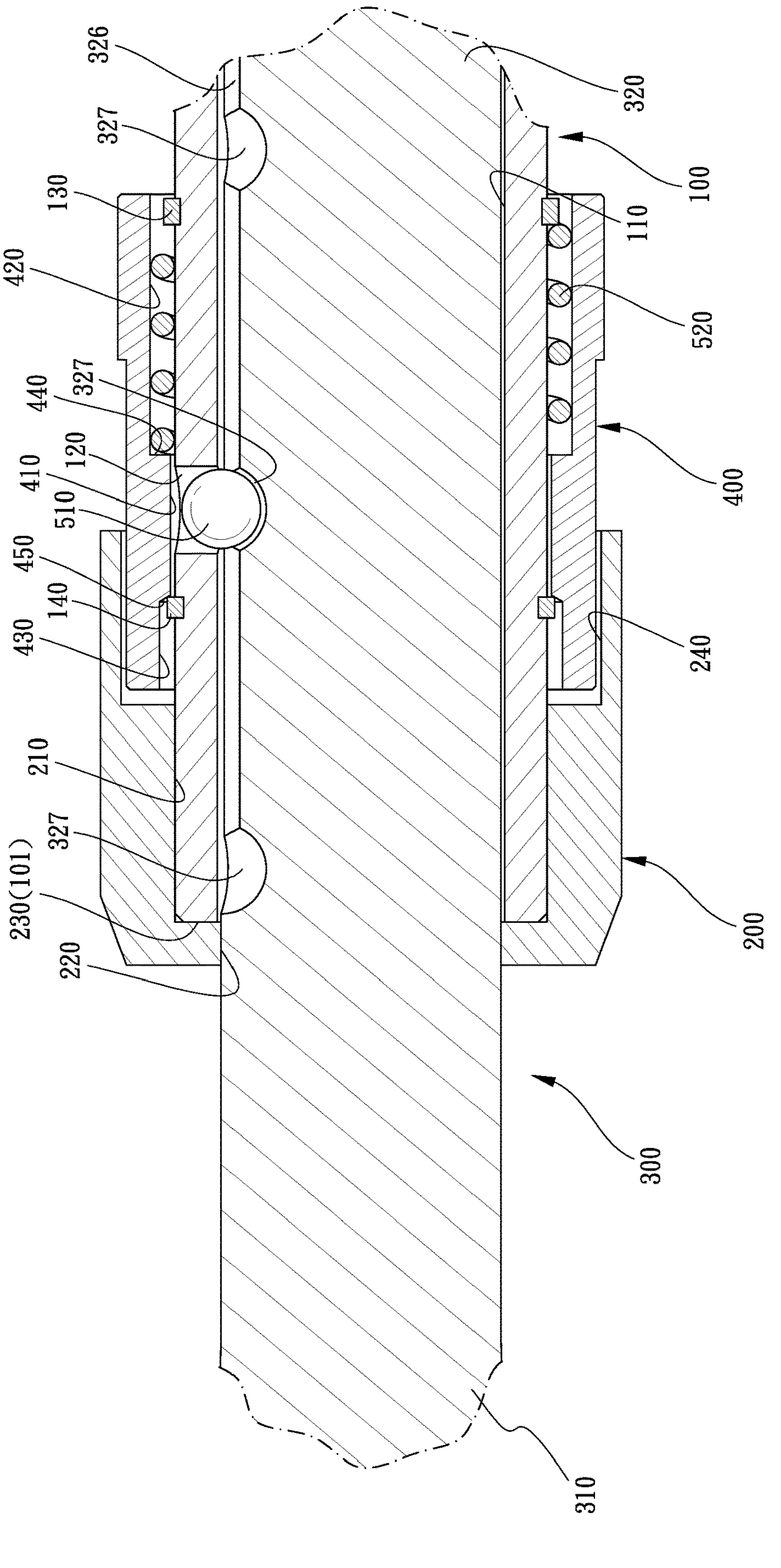
FIG. 11 is a cross sectional view to show that the length of the telescopic wrench is adjusted.

As shown in FIG. 7, the outer sleeve 200 has an entrance hole 240 which communicates with the first hole 210 of the outer sleeve 200. One end of the sliding sleeve 400 is normally extended into the entrance hole 240. The outer sleeve 200 does not contact the sliding ring 400. This arrangement does not affect the movement of the sliding sleeve 400.

Figure 12:
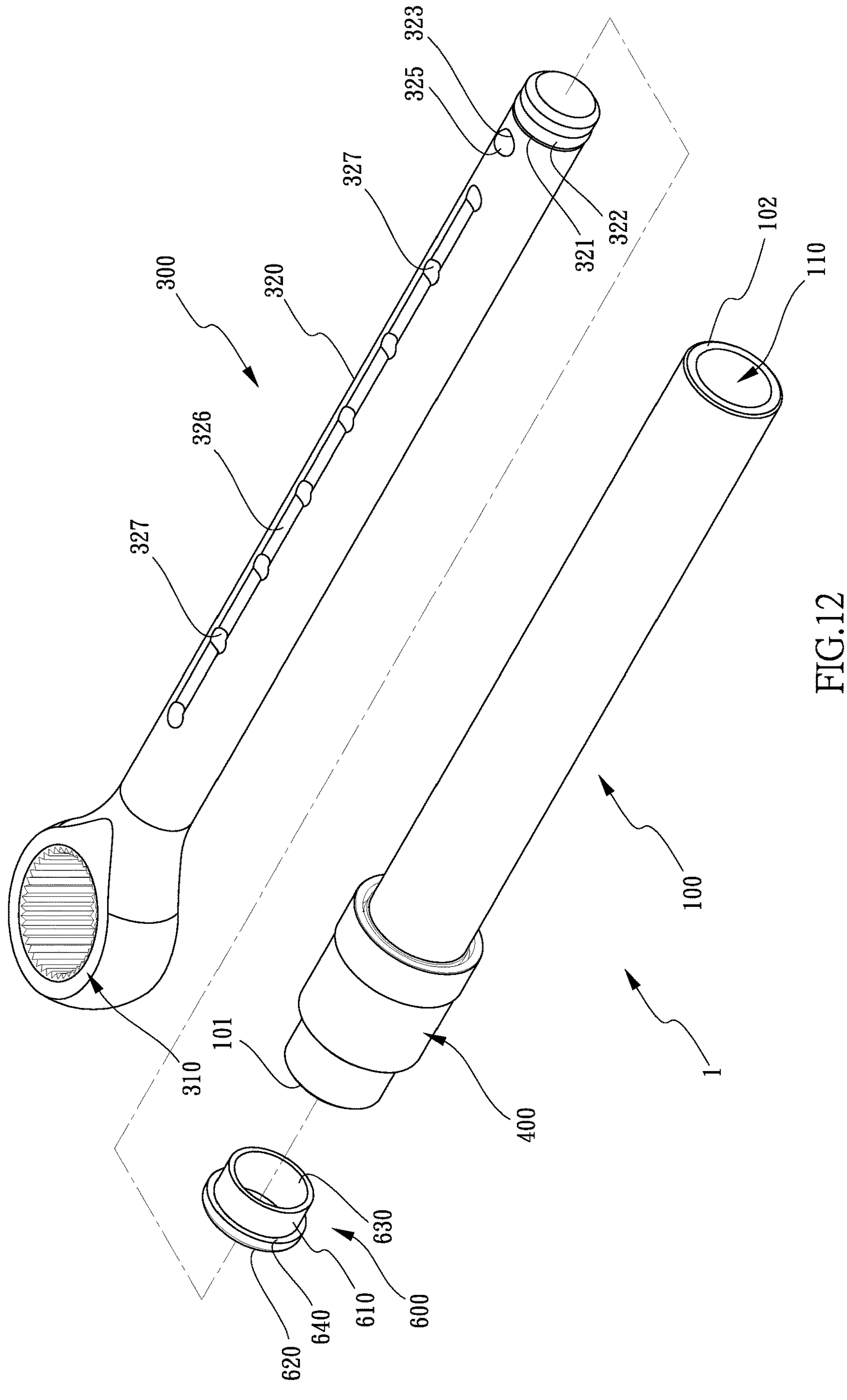
FIG. 12 is an exploded view of another embodiment of the telescopic wrench of the present invention.
Figure 13:
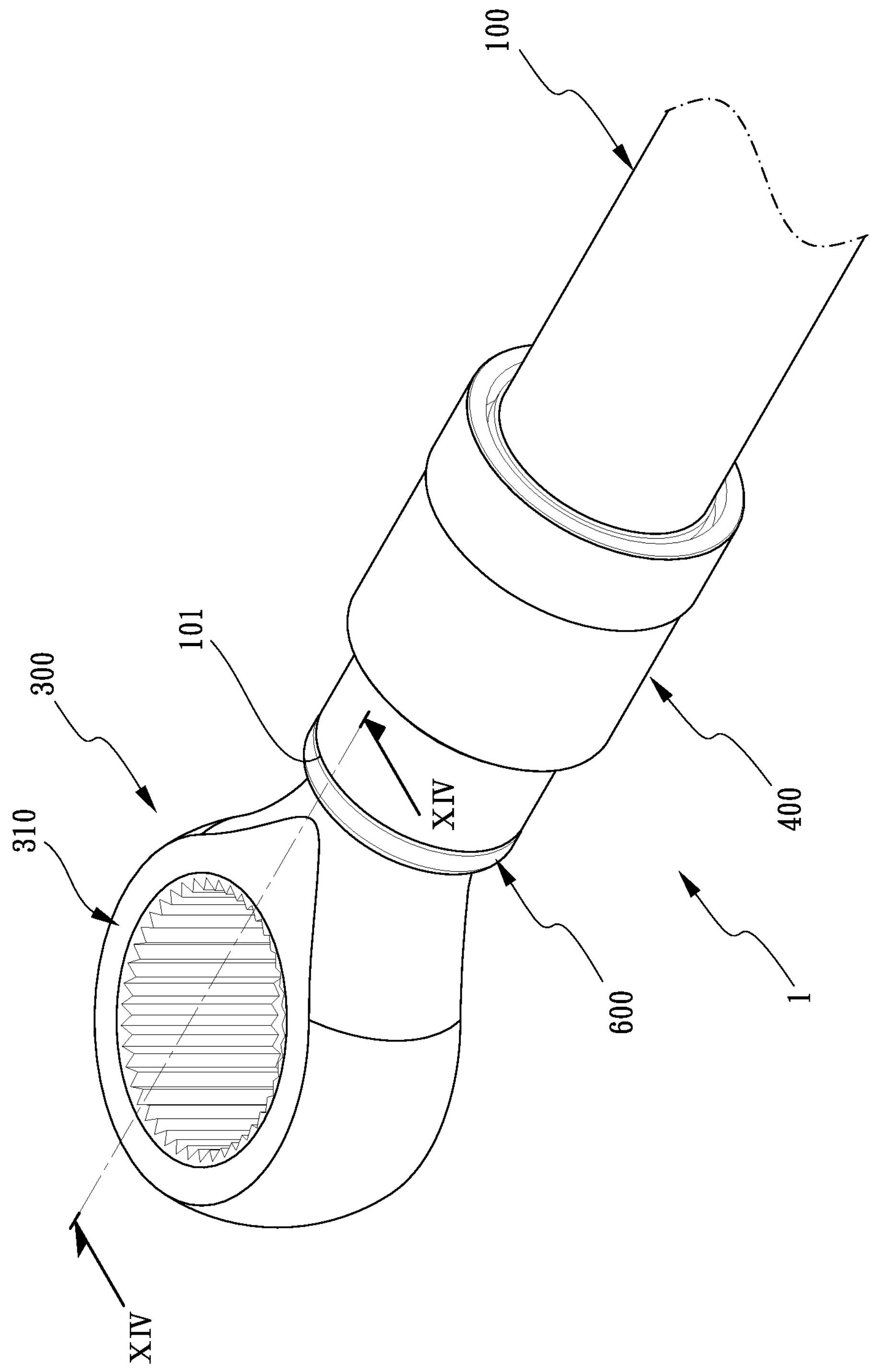
FIG. 13 is a perspective view to show the telescopic wrench in FIG. 12.
Figure 14:
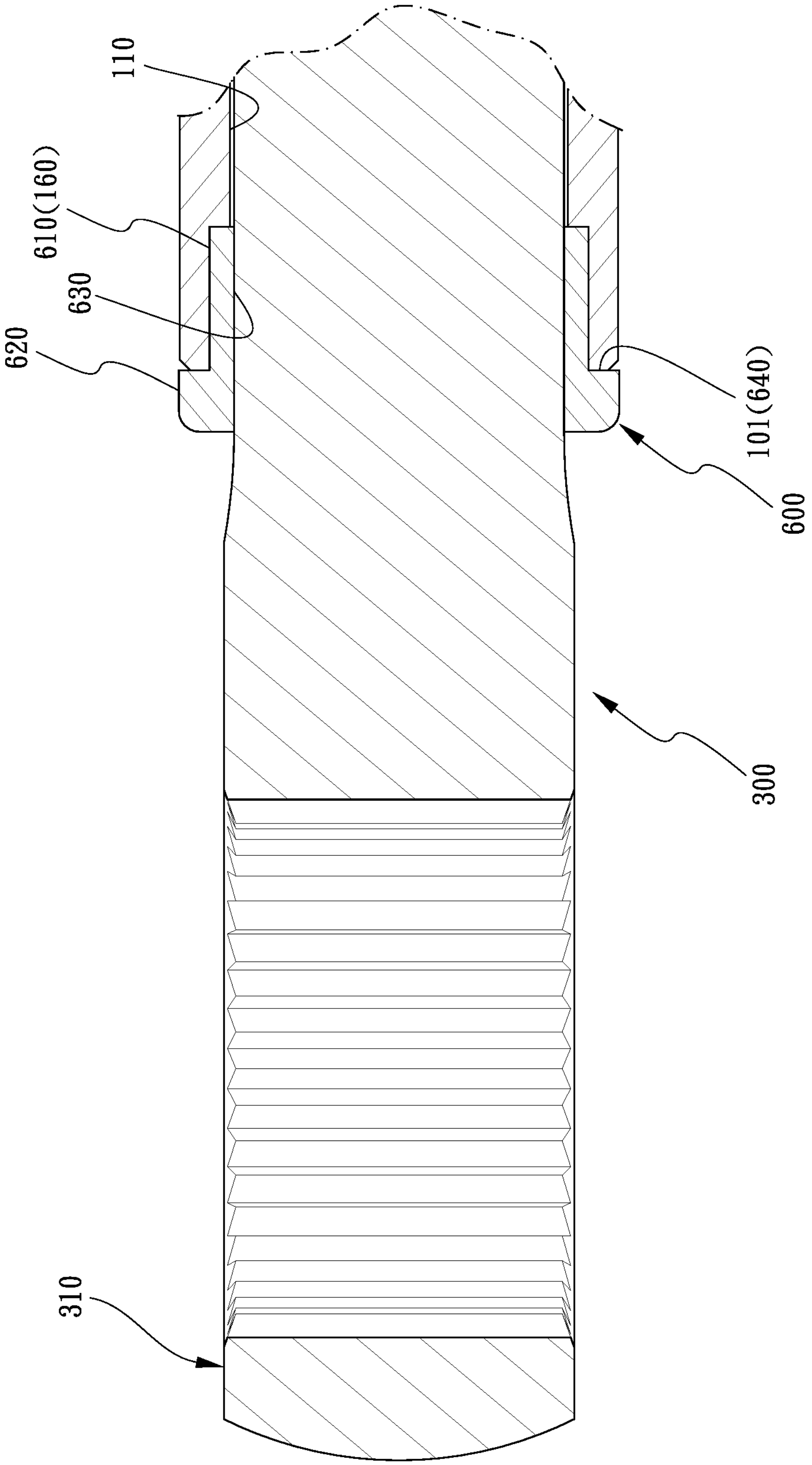
FIG. 14 is a cross sectional view, taken along line XIV-XIV in FIG. 13.

As shown in FIGS. 12-14, another embodiment of the present invention is disclosed, the differences from the first embodiment are that an accommodating hole 160 is defined in the first end 101 of the outer tube 100 and communicates with the passage 110. An end part 600 includes an insertion section 610 and an external section 620 formed on two opposite ends thereof. The insertion section 610 is inserted into the accommodating hole 160 of the outer tube 100. The external section 620 is located at the outside of the first end 101 of the outer tube 100. A through hole 630 is defined through the insertion section 610 and the external section 620. The through hole 630 communicates with the passage 110. The work end 310 is exposed beyond the external section 620.

Furthermore, the end part 600 includes a contact face 640 formed between the insertion section 610 and the external section 620. The contact face 640 contacts the end face of the first end 101 of the outer tube 100. Therefore, the end part 600 provides the telescopic wrench 1 with smooth and stable operation.

While we have shown and described the embodiment in accordance with the present invention, it should be clear to those skilled in the art that further embodiments may be made without departing from the scope of the present invention.

What is claimed is:

1. A telescopic wrench comprising: an outer tube having a passage defined axially therein, the outer tube having a first end and a second end on two opposite ends of the outer tube, an outer sleeve having a first hole and a second hole which is in communication with the first hole, the first hole of the outer sleeve being fitted to a first end of the outer tube, the outer sleeve having an abutment surface formed between the first hole and the second hole, the abutment surface being in contact with an end face of the first end of the outer tube, an inner rod having a work end and a rod section connecting to the work end, the rod section having an annular groove with which an elastic ring is engaged, the rod section being slidably engaged with the passage and the second hole, the elastic ring being compressed by contact with an inner periphery of the passage, the work end being exposed beyond the first end of the outer tube.

2. The telescopic wrench as claimed in claim 1, wherein the rod section has a hole defined radially in an outer periphery thereof, an elastic member elastically biased between an inner periphery of the hole and a bead, the bead contacts the passage.

3. The telescopic wrench as claimed in claim 1, wherein the rod section has an axial groove defined axially in an outer periphery of the rod section, multiple dents are spaced along the axial groove, the outer tube has a bore defined in an outer periphery thereof and communicating with the passage, a sliding sleeve slidably mounted to the outer tube and has a protrusion formed to an inner periphery thereof, a ball is located in the bore and engaged with one of the dents, the protrusion is located corresponding to the bore and restricts the ball from dropping out from the bore.

4. The telescopic wrench as claimed in claim 3, wherein the sliding sleeve includes a first recess and a second recess, the protrusion is located between the first and second recesses, the outer tube has a first ring mounted to the outer periphery of the outer tube and located in first the recess, the outer tube extends through a spring which is located between the first ring and a first end face on one of two sides of the protrusion of the sliding ring, a second ring is mounted to the outer periphery of the outer tube and is spaced from the first ring, the outer sleeve has an entrance hole which communicates with the first hole of the outer sleeve, one end of the sliding sleeve is normally extended into the entrance hole, the outer sleeve does not contact the sliding ring.

5. A telescopic wrench comprising: an outer tube having a passage defined axially therein, the outer tube having a first end and a second end on two opposite ends of the outer tube, an accommodating hole defined in the first end of the outer tube and communicating with the passage, an end part including an insertion section and an external section formed on two opposite ends thereof, the insertion section inserted into the accommodating hole of the outer tube, the external section is located at an outside of the first end of the outer tube, a through hole defined through the insertion section and the external section, the through hole communicates with the passage, an inner rod having a work end and a rod section connecting to the work end, the rod section being slidably engaged with the passage and the through hole, an elastic ring being compressed by contact with an inner periphery of the passage, the work end being exposed beyond the external section of the end part.

6. The telescopic wrench as claimed in claim 5, wherein the end part includes a contact face formed between the insertion section and the external section, the contact face contacts an end face of the first end of the outer tube.

7. The telescopic wrench as claimed in claim 5, wherein the rod section has a hole defined radially in an outer periphery thereof, an elastic member elastically biased between an inner periphery of the hole and a bead, the bead contacts the passage.

8. The telescopic wrench as claimed in claim 5, wherein the rod section has an axial groove defined axially in an outer periphery of the rod section, multiple dents are spaced along the axial groove, the outer tube has a bore defined in an outer periphery thereof and communicating with the passage, a sliding sleeve slidably mounted to the outer tube and has a protrusion formed to an inner periphery thereof, a ball is located in the bore and engaged with one of the dents, the protrusion is located corresponding to the bore and restricts the ball from dropping out from the bore.

9. The telescopic wrench as claimed in claim 8, wherein the sliding sleeve includes a first recess and a second recess, the protrusion is located between the first and second recesses, the outer tube has a first ring mounted to the outer periphery of the outer tube and located in the first recess, the outer tube extends through a spring which is located between the first ring and a first end face on one of two sides of the protrusion of the sliding ring, a second ring is mounted to the outer periphery of the outer tube and is spaced from the first ring, the outer sleeve has an entrance hole which communicates with the first hole of the outer sleeve, one end of the sliding sleeve is normally extended into the entrance hole, the outer sleeve does not contact the sliding ring.

* * * * *